Figure 1:
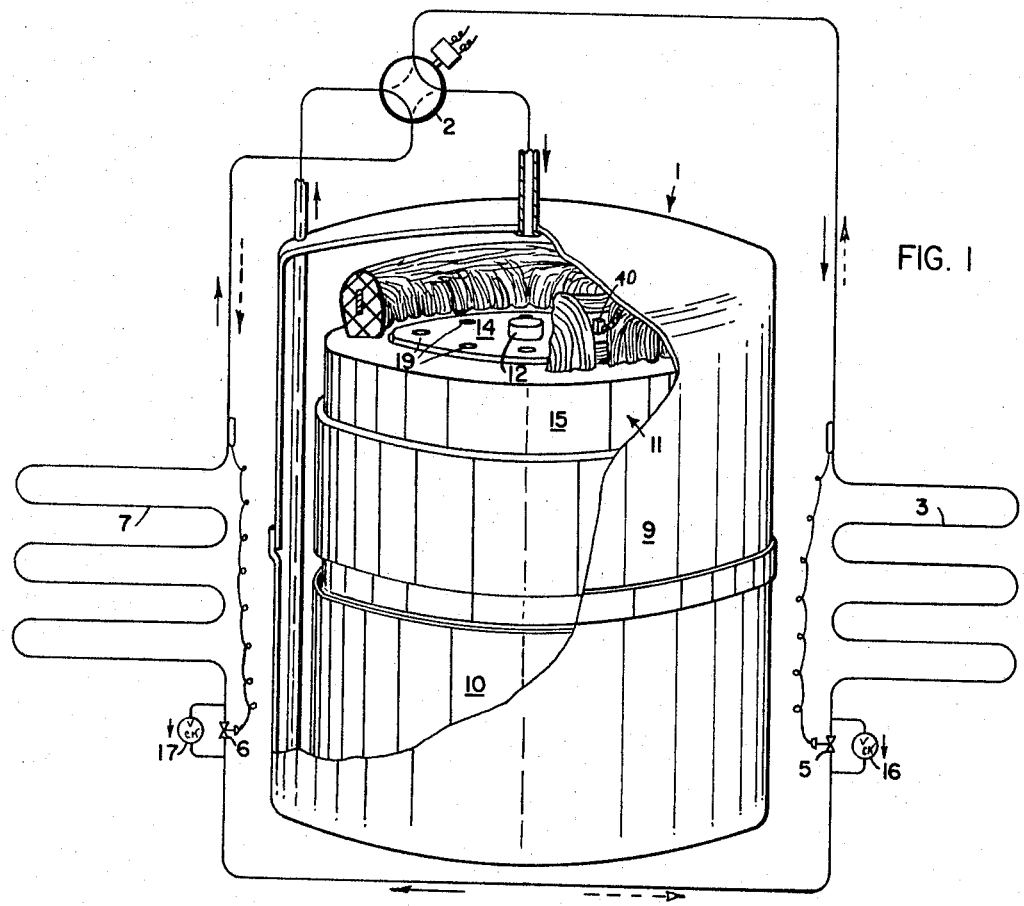

Feb. 21, 1967     H. G. STENGER     3,305,715
MOTOR CONTROL ARRANGEMENT

Filed Oct. 10, 1963

INVENTOR.
HARVEY G. STENGER.

BY *Frederick E. McMullen*

ATTORNEY.

United States Patent Office 3,305,715
Patented Feb. 21, 1967

3,305,715
MOTOR CONTROL ARRANGEMENT
Harvey G. Stenger, Skaneateles, N.Y., assignor to Carrier Corporation, Syracuse, N.Y., a corporation of Delaware
Filed Oct. 10, 1963, Ser. No. 315,204
4 Claims. (Cl. 318—221)

This invention relates to a control arrangement for a refrigeration system compressor motor, and more particularly to a control arrangement for protecting the refrigeration system compressor motor from excessive current and temperature.

Arrangements for protecting electric motors from excessive line current, referred to as overcurrent, and excessive winding temperature, referred to as overtemperature, are well known to the prior art. In refrigeration system applications, however, where an electric motor is relied upon to drive the system compressor, and the coupled compressor and motor are enclosed in a hermetically sealed housing in communication with the refrigeration system, prior art arrangements known to me are unable to provide the degree of overcurrent and overtemperature protection necessary.

For example, a known arrangement for guarding the motor against overcurrent senses temperature of the motor winding. Should an excessive current be drawn by the motor, the resulting increase in temperature of the motor winding is relied upon to trigger a mechanism for interrupting the energizing circuit to the motor winding. However, in applications where artificial cooling of the motor is employed, such as in a hermetically sealed motor compressor unit used in refrigeration systems, potentially damaging overcurrents may occur unaccompanied by the expected increase in motor winding temperature. This situation may arise in reverse cycle refrigeration systems during heating cycle operation. At that time, the load on the system compressor, and correspondingly on the compressor drive motor, is relatively light. In that situation, the degree and duration of overcurrent, necessary to cause motor winding temperature to rise to a point where the temperature based current overload responds may be so great as to seriously damage or destroy the motor.

Many proposed arrangements for protecting polyphase electric motors do not interrupt all of the power leads connecting the motor to the source of electrical energy when the motor draws an excess current or motor temperature exceeds a predetermined maximum. In many refrigeration system applications, complete interruption between the source of power and the compressor motor on the occurrence of excess motor current or temperature is highly desirable.

It is a principal object of this invention to provide an improved control arrangement for an electric motor operable to de-energize the motor at the occurrence of a predetermined overload condition.

It is an additional object of the present invention to provide a protective control arrangement for a polyphase electric motor effective to interrupt simultaneously each of the power supply lines to the motor at the occurrence of a fault in one of the motor phases.

It is a further object of the present invention to provide an arrangement for controlling the power input to the motor driving a refrigeration system compressor operable to disconnect the motor from the source of electrical energy in response to excessive motor current or temperature conditions.

It is an object of the present invention to provide an improved control arrangement for protecting a polyphase electric motor against both overcurrent and overtemperature conditions.

This invention relates to a control arrangement for protecting a polyphase electric motor operably connected to a source of electric energy from excessive current and temperature comprising switch means adapted when moved to a first position to interrupt the connection between the motor windings and the source of electric energy, means for actuating the switch means, and control means for energizing the moving means including means for sensing temperature of at least one of the motor windings operable in response to a predetermined temperature to energize the actuating means to move the switch means to the first position, and means for sensing current passing through each of the motor windings operable in response to a predetermined current to energize the actuating means to move the switch means to the first position, the current sensing means including a current sensing element between the switch means and each of the other motor windings.

Figure 2:
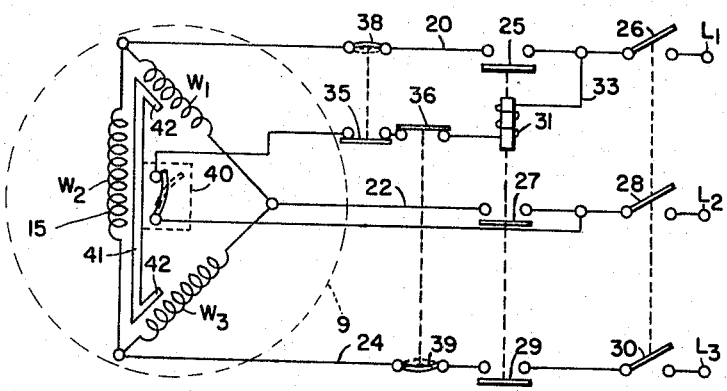

Other objects and advantages will be apparent from the ensuing description and the accompanying drawings in which:

FIGURE 1 is a schematic representation of a reverse cycle refrigeration system embodying the protective control arrangement of the present invention; and FIGURE 2 is a wiring diagram of the protective control arrangement.

Referring particularly to FIGURE 1 of the drawings, there is shown a refrigeration system of the reverse cycle type selectively operable to heat and cool having compression means 1, reversing valve 2, outdoor heat exchange coil 3, expansion means 5, 6, and indoor heat exchange coil 7, connected one to another by suitable conduit means to form a closed path for refrigerant flow. Compression means 1 includes a hermetic housing 9 having compressor 10 and drive motor 11 placed therein and operably connected together by shaft 12. Motor 11 includes rotor 14 rigidly attached to shaft 12 and stator 15 fixedly positioned within housing 9 and inductively connected to rotor 14.

The expansion means 5, 6 each preferably comprise a suitable thermal expansion valve. Expansion valves 5, 6 are each provided with a check valve controlled bypass 16, 17 respectively operable to pass refrigerant around valves 5, 6 respectively in the direction indicated by the solid line arrow in a manner to be more particularly explained hereinafter. It is understood that other suitable refrigerant expansion means may be employed in place of expansion valves 5, 6, for example, capillary type expansion means.

In operation of the system shown in FIGURE 1 on the cooling cycle, reversing valve 2 is positioned in the solid line position by suitable means. Relatively high pressure gaseous refrigerant discharge from compression means 1 is directed by the reversing valve 2 to heat exchange coil 3, acting as a condenser. Ambient air circumjacent coil 3 extracts heat from the refrigerant flowing therethrough thereby condensing the refrigerant. The condensed refrigerant leaving coil 3 is bypassed around expansion valve 5 by the check valve controlled bypass 16 and flows through expansion valve 6 wherein the refrigerant is expanded to a lower pressure. Low pressure refrigerant from expansion valve 6 passing through heat exchange coil 7, acting as an evaporator, extracts heat from the medium surrounding coil 7 thereby vaporizing the refrigerant. The relatively low pressure gaseous refrigerant discharged from coil 7 is returned by reversing valve 2 to compression means 1.

For heating cycle operation, reversing valve 2 is moved by suitable means to the dotted line position shown in FIGURE 1 of the drawings. Relatively high pressure gaseous refrigerant discharged from compression means 1 is directed by reversing valve 2 to heat exchange coil 7, acting as a condenser. Medium surrounding coil 7 extracts heat from the refrigerant flowing therethrough thereby condensing the refrigerant. The condensed refrigerant leaving coil 7 is bypassed around expansion valve 6 by the check valve controlled bypass 17 and flows through expansion valve 5 wherein the refrigerant is expanded to a lower pressure. Low pressure refrigerant from expansion valve 5 passing through heat exchange coil 3 acting as an evaporator extracts heat from the ambient air circumjacent coil 3 thereby vaporizing the refrigerant. The relatively low pressure gaseous refrigerant discharged from coil 3 is returned by reversing valve 2 to the compression means 1.

Relatively low pressure gaseous refrigerant from heat exchange coil 7 during cooling cycle operation and from heat exchange coil 3 during heating cycle operation, passing through reversing valve 2 to compression means 1 is brought into heat exchange relationship with compressor motor 11 bypassing the refrigerant through passages 19 in motor rotor 14 and through the space between the motor rotor 14 and stator 15 to the suction side of compressor 10. By this arrangement, operating temperature of the compressor motor 11 may be maintained within desired limits.

Referring particularly to FIGURE 2 of the drawings, there is shown schematically the stator or field 15 of compressor drive motor 11. Motor 11 is preferably a polyphase dynamoelectric machine having plural winding sections $W_1$, $W_2$, $W_3$ electrically connected one to another. Windings $W_1$, $W_2$, $W_3$ are illustrated in FIGURE 2 as connected in delta fashion. Other connecting arrangements between motor windings may be envisioned, for example, a Y connection. Additionally, it is understood that the number of a stator windings W may be varied.

Lines 20, 22, 24 connect windings $W_1$, $W_2$, $W_3$ respectively to one terminal of normally opened control switches 25, 27, 29 respectively. The other terminal of control switches 25, 27, 29 is connected by power leads $L_1$, $L_2$, $L_3$ respectively through suitable start-stop switches 26, 28, 30 respectively to a source of alternating current power.

A solenoid 31 operably connected to control switches 25, 27, 29 and adapted when energized to move normally opened control switches 25, 27, 29 to a closed position to complete a circuit from power leads $L_1$, $L_2$, $L_3$ through start-stop switches 26, 28, 30 and lines 20, 22, 24 respectively to energize windings $W_1$, $W_2$, $W_3$ is provided. Solenoid 31 is adapted to be energized by line 33 connected across power leads $L_1$ and $L_2$.

Line 33 includes normally closed switches 35, 36 in series therewith. Opening of switch 35 or 36 in a manner to be more fully explained hereinafter interrupts line 33 to de-energize solenoid 31 to open control switches 25, 27, 29 and de-energize windings $W_1$, $W_2$, $W_3$ respectively. Suitable overcurrent sensing devices 38, 39 are provided for sensing current flow through lines 20 and 24 respectively. Overcurrent sensing devices 38, 39 each preferably comprise a bimetallic element in lines 20, 24 respectively. The bimetallic elements of overcurrent sensing devices 38, 39 undergo a change in temperature in response to a change in the flow of current therethrough. At a predetermined temperature representing predetermined current flow through line 20 or 24, the bimetallic element of overcurrent sensing device 38 or 39 moves from the position shown in solid lines in FIGURE 2 of the drawings to the position shown in dotted lines. The bimetallic elements of overcurrent sensing device 38 and 39 are operably connected to normally closed switches 35, 36 respectively by a suitable means. At a predetermined current flow through line 20 or 24, the bimetallic element of overcurrent sensing device 38 or 39 moves normally closed switch 35 or 36 to open position to interrupt line 33 and de-energize solenoid 31. As noted heretofore, de-energization of solenoid 31 permits control switches 25, 27, 29 to open to interrupt the circuit between the power source and windings $W_1$, $W_2$, $W_3$. While overcurrent sensing devices 38, 39 are described as comprised of a bimetallic element in lines 20, 24 respectively, other types of current sensing devices may be readily contemplated.

A normally closed thermal switch 40 in line 33 is provided. Opening of switch 40 interrupts line 33 to de-energize solenoid 31 to open control switches 25, 27, 29 and interrupt the circuit between the power source and each of windings $W_1$, $W_2$, $W_3$. Thermal switch 40 is preferably in intimate heat exchange relationship with winding $W_2$. In a preferred embodiment of the invention, switch 40 is fastened to winding $W_2$ by means of a generally C-shaped strap-like member 41 buried within the winding in the manner shown in FIGURE 1 of the drawings. Legs 42 of member 41 are disposed closely adjacent to and in heat exchange relationship with windings $W_1$ and $W_3$ respectively. Thermal switch 40 may comprise a suitable bimetallic switch arm operable at the occurrence of a predetermined temperature to interrupt line 33 and de-energize magnetic solenoid 31.

Operation

With switches 35, 36, 40 closed, closure of the start-stop switches 26, 28, 30 completes a circuit through lead $L_1$, line 33, switches 35, 36, 40 to lead $L_2$ to energize solenoid 31. Solenoid 31 upon energization closes control switches 25, 27, 29 to complete a circuit from power leads $L_1$, $L_2$, $L_3$ through start-stop switches 26, 28, 30, control switches 25, 27, 29 and lines 20, 22, 24 to energize windings $W_1$, $W_2$, $W_3$.

At the occurrence of a predetermined overcurrent in windings $W_1$, $W_2$, or $W_3$, the overcurrent sensing device 38 or 39 moves switch 35 or 36 to open position interrupting line 33 and de-energizing solenoid 31. De-energization of solenoid 31 opens control switches 25, 27, 29 to interrupt the energizing circuit to motor windings $W_1$, $W_2$, $W_3$.

An overcurrent in winding $W_1$, $W_2$, or $W_3$ causes the temperature of that winding to increase. Thermal switch 40, held in intimate heat exchange relationship with winding $W_2$ by strap-like member 41, senses increased temperature of winding $W_2$. At a predetermined temperature, thermal switch 40 opens to interrupt line 33 and de-energize solenoid 31. De-energization of solenoid 31 interrupts the circuit to motor windings $W_1$, $W_2$, $W_3$ in the manner explained heretofore.

Thermal switch 40 is additionally responsive to a change in temperature of windings $W_1$ and $W_3$. As described heretofore, legs 42 of strap-like member 41 are disposed in heat exchange relationship with windings $W_1$ and $W_3$. Heat dissipated by windings $W_1$ and $W_3$ is accordingly conducted to thermal switch 40 through the strap-like member 41. As noted, at a predetermined temperature switch 40 opens to de-energize solenoid 31 and interrupt the circuit to windings $W_1$, $W_2$, $W_3$.

By applicant's unique protective control arrangement, each phase of a polyphase compressor motor is protected against excessive current and excessive temperature. Furthermore, applicant's novel protective control arrangement interrupts all the power connections to the motor at the occurrence of either a predetermined excessive current or excessive temperature.

While I have described and illustrated a preferred embodiment of my invention, it will be understood that my invention is not limited thereto since it might be otherwise embodied within the scope of the following claims.

I claim:
1. In a control arrangement for a polyphase electric motor operably connected to a source of electric energy, the combination of switch means adapted when moved to a first position to interrupt the connection between the motor windings and the source of electric energy, means for actuating said switch means, and control means for said actuating means including means for sensing temperature of one of said motor windings operable in response to a predetermined temperature to energize said actuating means to move said switch means to said first position, and means for sensing current passing through each of said motor windings operable in response to a predetermined current to energize said actuating means to move said switch means to said first position, said current sensing means including a current sensing element between said switch means and each of the other motor windings.

2. A protective control arrangement according to claim 1 in which said actuating means includes a solenoid operable when energized to move said switch means to a second position to connect said motor phases to the source of electric energy, and a circuit adapted to connect said solenoid with the source of electric energy said control means including means for interrupting said circuit to de-energize said solenoid to move said switch means to said first position.

3. In combination with a polyphase electric motor having at least three power terminals, a control arrangement comprising a normally open switch in series with each of said power terminals adapted when closed to connect each of said terminals with a power supply line, means adapted when energized to close said switches to energize said motor, and control means for said closing means including a circuit for connecting said closing means across a pair of said power supply lines to energize said closing means, first, second, and third protective switches in said circuit each operable when open to interrupt said circuit to de-energize said closing means, first current sensing means for opening said first switch in response to predetermined current flow through one of said power terminals, second current sensing means for opening said second switch in response to predetermined current flow through a second of said power terminals, and means for opening said third switch in response to predetermined temperature conditions of said motor windings.

4. A control arrangement according to claim 3 in which said temperature responsive means comprises a bimetallic element, and means for attaching said bimetallic element to the motor winding associated with the third of said power terminals in heat exchange relationship with each of said motor windings.

References Cited by the Examiner
UNITED STATES PATENTS

| | | | |
|---|---|---|---|
| 2,835,860 | 5/1958 | Delaney | 318—474 X |
| 2,909,719 | 10/1959 | Dubberley | 318—473 |
| 3,192,463 | 6/1965 | Kyle | 318—473 |

ORIS L. RADER, *Primary Examiner.*

G. A. FRIEDBERG, *Assistant Examiner.*